Figure 1:
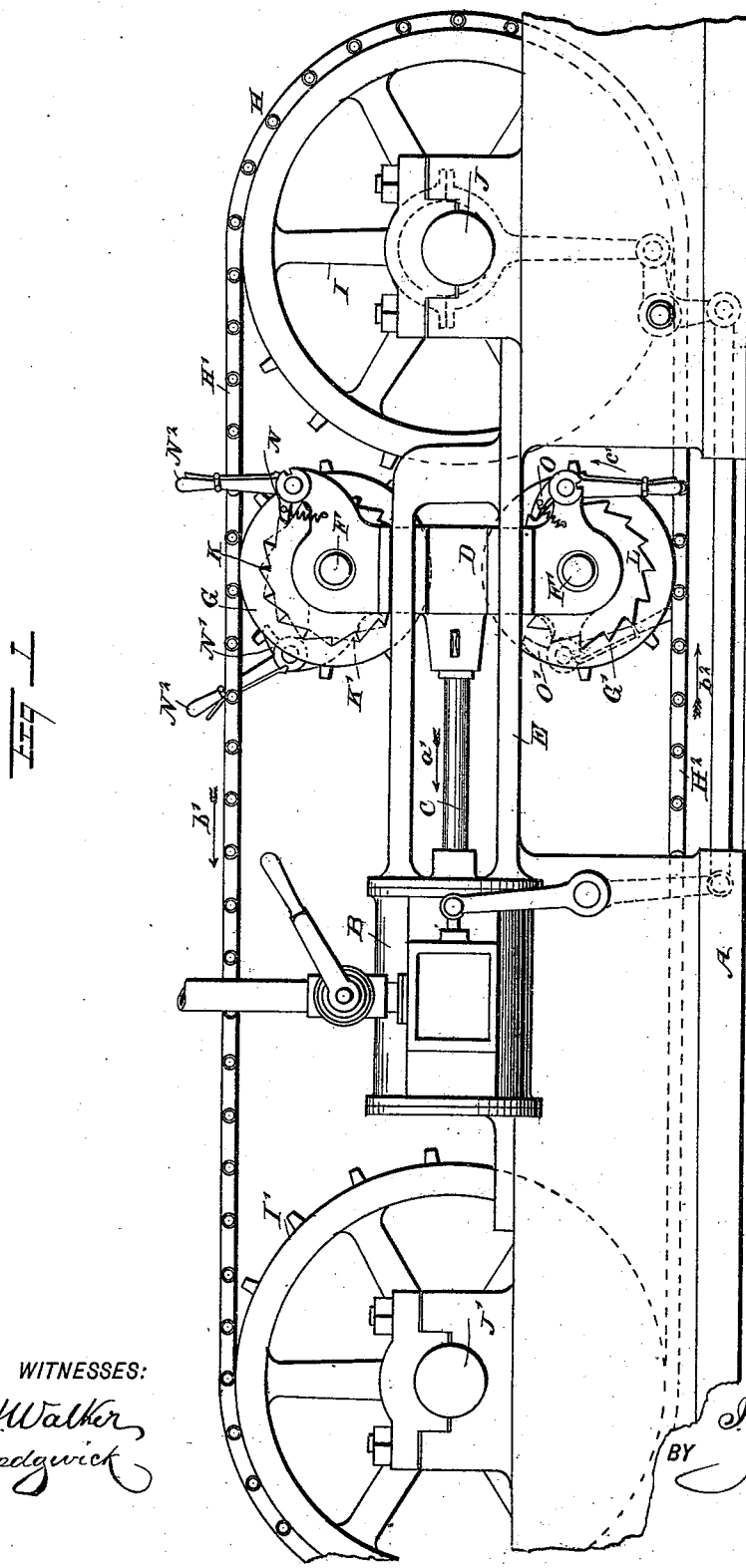

(No Model.) 2 Sheets—Sheet 1.

I. S. BRYANT.
MECHANICAL MOVEMENT.

No. 512,094. Patented Jan. 2, 1894.

WITNESSES:
H. Walker
C. Sedgwick

INVENTOR
I. S. Bryant
BY
Munn & Co
ATTORNEYS.

(No Model.) 2 Sheets—Sheet 2
I. S. BRYANT.
MECHANICAL MOVEMENT.
No. 512,094. Patented Jan. 2, 1894.
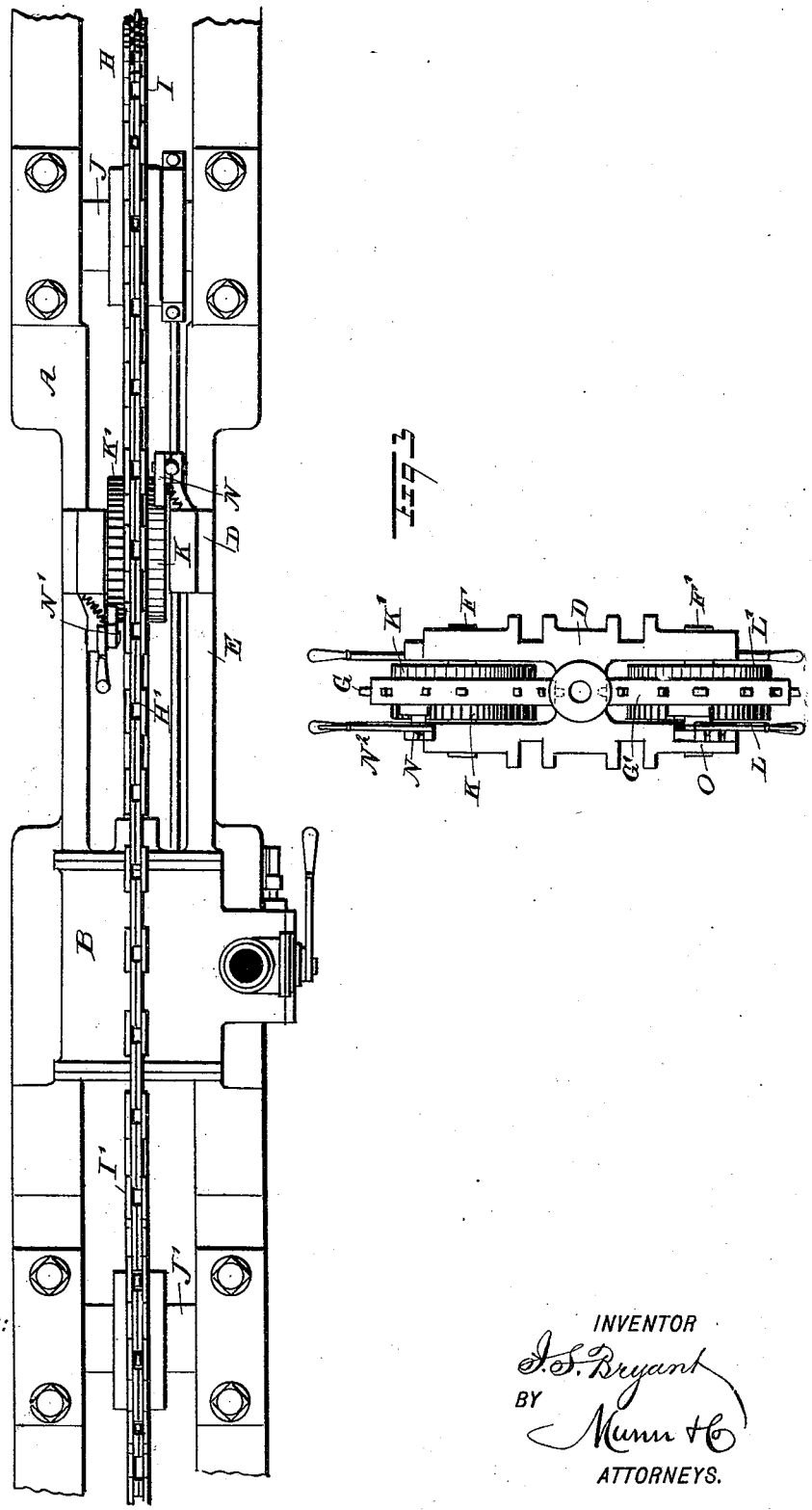
WITNESSES:
H. Walker
C. Sedgwick
INVENTOR
I. S. Bryant
BY
Munn & Co
ATTORNEYS.

UNITED STATES PATENT OFFICE.

ISAAC S. BRYANT, OF LA JUNTA, COLORADO.

MECHANICAL MOVEMENT.

SPECIFICATION forming part of Letters Patent No. 512,094, dated January 2, 1894.

Application filed March 15, 1893. Serial No. 466,030. (No model.)

*To all whom it may concern:*

Be it known that I, ISAAC S. BRYANT, of La Junta, in the county of Otero and State of Colorado, have invented a new and Improved Mechanical Movement, of which the following is a full, clear, and exact description.

The object of the invention is to provide a new and improved mechanical movement, which is simple and durable in construction and more especially designed for use on engines and other motors, to convert reciprocating motion into rotary motion, avoiding all dead center positions of the transmitting parts.

The invention consists of a reciprocating cross-head and sprocket wheels mounted thereon, and engaging the upper and lower strands of a sprocket chain, the said wheels being adapted to be locked in position.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a plan view of the same; and Fig. 3 is an end elevation of the cross-head and the sprocket wheels supported thereon.

The improved mechanical movement is mounted on a suitably-constructed frame A, which supports a cylinder B connected with a suitable source of supply to actuate the piston therein, so that the piston rod C imparts the usual reciprocating motion to the cross-head D mounted to slide in the guideways E. On the upper and lower ends of the cross-head D are journaled the shafts F and F', on which are secured the sprocket wheels G and G' respectively, engaging the upper and lower strands or runs H' and $H^2$ respectively, of a sprocket chain H passing over a sprocket wheel I, secured on the main driving shaft J journaled at one end of the frame A, as plainly shown in Figs. 1 and 2. The sprocket chain H also passes over a sprocket wheel I' secured on a shaft J' mounted on the other end of the frame A and serving to carry the strands H' and $H^2$ of the sprocket chain H above and below the cylinder B, or other working parts of the device. The sprocket wheels G and G', are adapted to be locked in position when traveling in one direction and to rotate loosely when traveling in an opposite direction. For this purpose, the sprocket wheel G is provided on opposite faces with the ratchet wheels K and K' and similar ratchet wheels L and L' are provided on opposite faces of the other sprocket wheel G'.

The teeth of the ratchet wheel K stand in an opposite direction to those of the ratchet wheel K', and the ratchet wheels L and L' are similarly arranged, as indicated in the drawings. The ratchet wheel K is adapted to be engaged by a spring pressed pawl N, and the ratchet wheel K' is adapted to be engaged by a spring pressed pawl N', both pawls N and N' being held on the cross-head D and provided with hand levers $N^2$ under the control of the operator, so as to throw the pawls N and N' in or out of mesh with their respective ratchet wheels K and K', as required.

The ratchet wheels L and L' are adapted to be similarly engaged by spring pressed pawls O and O', respectively, it being understood that when one of the pawls N or N' is out of mesh with its ratchet wheel, then the other pawl is in mesh with the corresponding ratchet wheel. The pawls O and O' for the ratchet wheels L and L' are arranged in a like manner. When the several parts are in the position as shown in Fig. 1, the pawls N' and O' are out of mesh with their ratchet wheels K' and L' respectively, while the other pawls N and O are in mesh with their ratchet wheels K and L.

Now, when the piston rod C and cross-head D travel in the direction of the arrow $a'$,— that is, inward,—before a rotary motion of the sprocket wheel G is prevented by the pawl N locking the ratchet wheel K, then the said sprocket wheel by the tooth in engagement with the upper strand H' of the sprocket chain H, causes the said strand to travel forward in the direction of the arrow $b'$. At the same time the other sprocket wheel G' is free to roll off on the lower strand $H^2$ as the latter travels in the direction of the arrow $b^2$, it being understood that the pawl O then glides over the teeth of the ratchet wheel L, as the latter rotates in the direction of the arrow $c'$. Now, when the cross-head D has arrived at the end of its inward stroke, and moves outward in the inverse direction of the arrow $a'$, the sprocket wheel $G'$ is locked in place by the pawl O engaging the ratchet wheel L, so that the corresponding tooth of the said sprocket wheel engaging the lower strand $H^2$ of the chain H imparts a movement to the said strand in the direction of the arrow $b^2$ while at the same time the other sprocket wheel G revolves loosely, rolling off on the traveling strand $H'$ of the chain H.

It will be seen that on the forward and backward movement of the cross-head D a continuous traveling motion is given to the sprocket chain H, so that the sprocket wheel I imparts a continuous rotary motion to the main driving shaft J and the machinery connected therewith, as long as the motive agent actuates the piston in the cylinder B.

When it is desired to rotate the main driving shaft J in an opposite direction, that is, reversing the motor, then the pawls N and O, are thrown out of mesh with their respective ratchet wheels K and L, and the other pawls $N'$ and $O'$ are thrown in mesh with their respective ratchet wheels $K'$ and $L'$. In this case, the sprocket wheel G will impart a traveling motion to the upper strand $H'$ in the inverse direction of the arrow $b'$ at the time the cross-head D is on its outward stroke, that is, travels in the inverse direction of the arrow $a'$, and the sprocket wheel $G'$ actuates the lower strand $H^2$ at the time the cross-head D is on its inward stroke and travels in the direction of the arrow $a'$. It will be seen that by this arrangement all dead center positions of the several parts are completely avoided, and a continuous rotary motion is given to the main driving shaft J. It will further be seen that considerable power is given to the shaft J, it being however rotated proportionately slow, so that the engine is more adapted for slow, but powerful work.

Having thus fully described my invention, I claim as new and desire to secure by Letters Patent—

1. The combination with the endless chain and sprocket wheels around which said chain passes, of a reciprocating cross head, loose sprocket wheels journaled on the cross head and engaging the two runs of the chain and pawl and ratchet mechanisms for locking the loose sprocket wheels alternately to impart a continuous traveling movement to the chain, substantially as set forth.

2. The combination with an endless chain and sprocket wheels around which the chain passes, of a reciprocating cross head, two loose sprocket wheels journaled on the cross head to engage the two runs of the chain, and a pair of oppositely arranged pawl and ratchet mechanisms for locking each loose sprocket to the cross head; whereby the chain may be propelled in either direction, substantially as set forth.

ISAAC S. BRYANT.

Witnesses:
C. R. BUCKEY,
W. A. HART.